(12) United States Patent
Liao et al.

(10) Patent No.: US 10,981,339 B2
(45) Date of Patent: Apr. 20, 2021

(54) LUGGAGE SHELL FABRICATION METHOD

(71) Applicant: QUEST COMPOSITE TECHNOLOGY CORPORATION, Dongguan (CN)

(72) Inventors: Yuan-Hong Liao, Dongguan (CN); Su-Chun Wu, Dongguan (CN)

(73) Assignee: Quest Composite Technology Corporation, Dongguan (CN)

( * ) Notice: Subject to any disclaimer, the term of this patent is extended or adjusted under 35 U.S.C. 154(b) by 251 days.

(21) Appl. No.: 16/007,409

(22) Filed: Jun. 13, 2018

(65) Prior Publication Data

US 2019/0366650 A1 Dec. 5, 2019

(30) Foreign Application Priority Data

May 31, 2018 (CN) .......................... 201810550815.5

(51) Int. Cl.
| | | |
|---|---|---|
| *B29C 69/02* | (2006.01) |
| *B29C 43/10* | (2006.01) |
| *B29C 43/18* | (2006.01) |
| *B29C 51/10* | (2006.01) |
| *B29K 63/00* | (2006.01) |
| *B29K 67/00* | (2006.01) |
| *B29K 101/12* | (2006.01) |
| *B29K 105/00* | (2006.01) |
| *B29L 31/00* | (2006.01) |

(52) U.S. Cl.
CPC .............. *B29C 69/02* (2013.01); *B29C 43/10* (2013.01); *B29C 43/183* (2013.01); *B29C 51/10* (2013.01); *B29K 2063/00* (2013.01); *B29K 2067/00* (2013.01); *B29K 2101/12* (2013.01); *B29K 2105/256* (2013.01); *B29L 2031/7418* (2013.01)

(58) Field of Classification Search
None
See application file for complete search history.

*Primary Examiner* — Monica A Huson
(74) *Attorney, Agent, or Firm* — Muncy, Geissler, Olds & Lowe, P.C.

(57) ABSTRACT

A luggage shell fabrication method includes the step of making a thermoplastic sheet into a shell using a vacuum molding method, the step of placing the shell in a female mold area of a heating mold, the step of applying a molten thermosetting plastic layer to the inner surface of the shell; and the step of pressing the thermosetting plastic layer toward the inner surface of the shell and simultaneously heating the molten thermosetting plastic layer and the shell for causing the shell and the thermosetting plastic layer to be combined with each other to form a luggage shell.

8 Claims, 6 Drawing Sheets

LUGGAGE SHELL FABRICATION METHOD

BACKGROUND OF THE INVENTION

1. Field of the Invention

The present invention relates to luggage technology and more particularly, to a luggage shell fabrication method with impact resistance.

2. Description of the Related Art

The luggage currently on the market is usually made of thermoplastic or aluminum-magnesium alloy. In the case of a luggage made of a thermoplastic material, the luggage is usually formed by a combination of two half shells. The manufacturer usually will sew a cloth on the inside of each half shell, and then pivotally connect the two half shells together and assemble the connected two half shells wheels and a handle to complete luggage. When the luggage is transported on the airport transportation line, it may be impacted or caused to fall. Therefore, the luggage made of thermoplastics (such as ABS resin) may be broken and damaged, causing inconvenience to the user, and the user may need to buy a new luggage for replacement.

Therefore, conventional luggage designs still have shortcomings that need to be improved.

SUMMARY OF THE INVENTION

The present invention has been accomplished under the circumstances in view. It is the main object of the present invention to provide a luggage shell fabrication method, which reinforces the structural strength of the luggage shell thus made.

To achieve this and other objects of the present invention, a luggage shell fabrication method comprises the steps of: A) applying a vacuum molding method to make a thermoplastic sheet into a shell that comprises an outer surface, an opposing inner surface and an accommodation chamber surrounded by the inner surface; B) providing a heating mold that defines a female mold area and an inner wall surface in the female mold area and then placing the shell in the female mold area to attach the outer surface of the shell to the inner wall surface in the female mold area; C) applying a thermosetting plastic layer to the inner surface of the shell; and D) placing an inflatable airbag in the accommodation chamber of the shell and then inflating the inflatable airbag against the thermosetting plastic layer and simultaneously operating the heating mold to heat the shell and the thermosetting plastic layer in the female mold area for causing the shell and the thermosetting plastic layer to be combined with each other to form a luggage shell.

Preferably, in Step D, the female mold area is heated to about 140° C.~150° C.

Preferably, in Step A, the thermoplastic sheet is transparent.

Preferably, the luggage shell fabrication method further comprises a sub-step in Step A or Step B to form a pattern on the inner surface of the shell by pain-spraying, printing or label-adhering technique.

Preferably, in step A, the vacuum molding method is performed by: providing a vacuum molding device comprising a mold body, and then placing the thermoplastic sheet in the vacuum molding device and then heating the vacuum molding device to create a negative pressure so that the thermoplastic sheet is attached to the surface of the mold body and formed into the shell.

Preferably, in Step C, the thermosetting plastic layer is in a molten status.

Preferably, in Step D, the molten thermosetting plastic layer is heated by the heating mold and cured and bonded to the inner surface of the shell.

Preferably, the luggage shell fabrication method further comprises Step E after Step D to remove the inflatable airbag from the accommodation chamber of the shell and then to cool down the luggage shell.

In conclusion, the luggage shell fabrication method is achieved by combining the thermosetting plastic layer with the inner surface of the shell; the structural strength of the shell can be reinforced to avoid damage due to collision or fall. In addition, according to the luggage shell fabrication method provided by the present invention, the thermosetting plastic layer can be applied to specific areas (for example, four corners) of the inner surface of the shell according to different needs for specific area reinforcement instead of covering the overall surface area of the inner surface of the shell. This not only achieves the function of reinforcing the structural strength, but also reduces the overall weight of the luggage shell.

Other advantages and features of the present invention will be fully understood by reference to the following specification in conjunction with the accompanying drawings, in which like reference signs denote like components of structure.

DETAILED DESCRIPTION OF THE INVENTION

A luggage shell fabrication method in accordance with the present invention is adapted for making a luggage shell 100. The luggage shell fabrication method comprises the steps described hereinafter.

Figure 1:
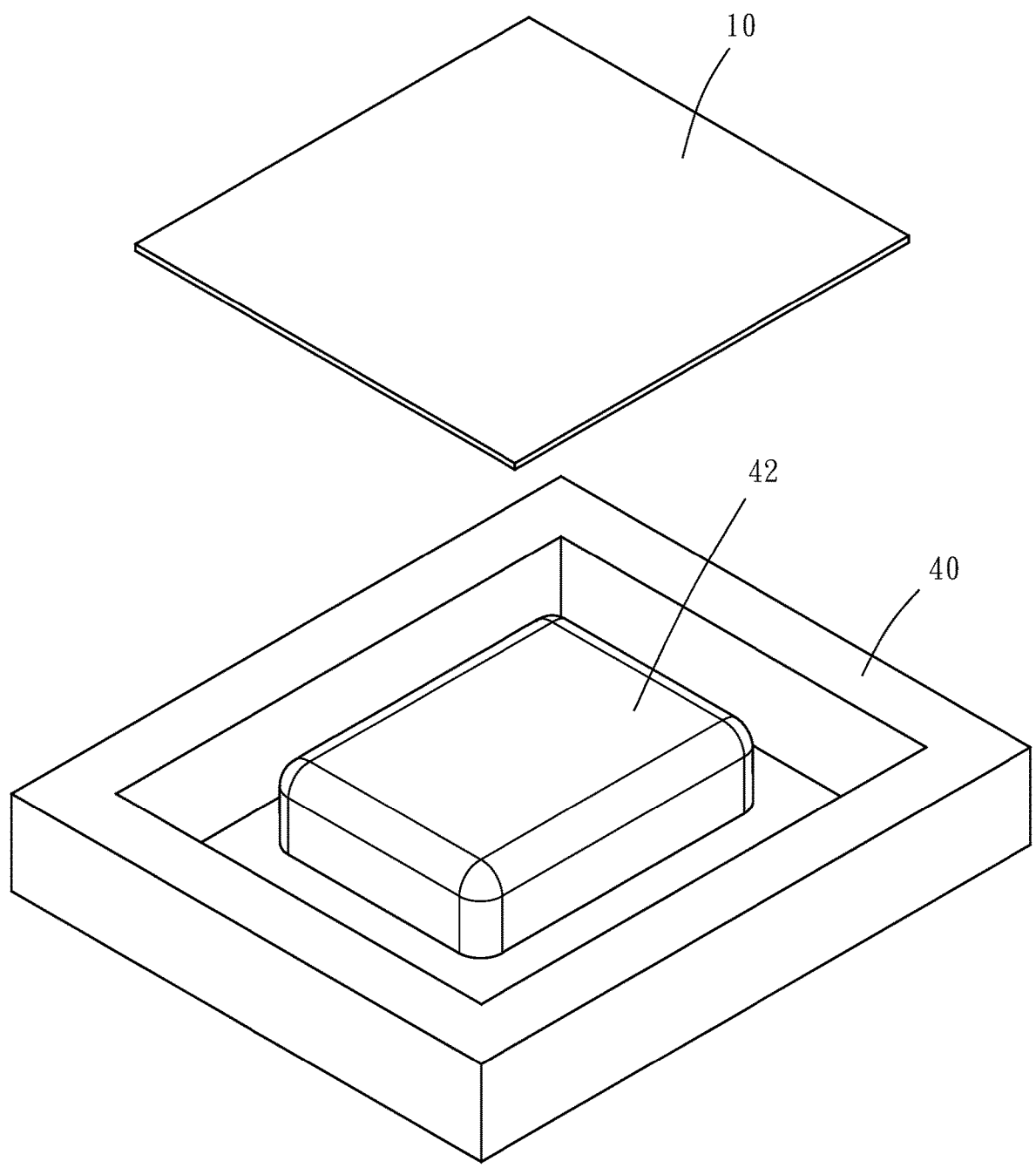
FIG. 1 is a schematic drawing illustrating a thermoplastic shell made into a shell by the application of a vacuum molding method (I).
Figure 2:
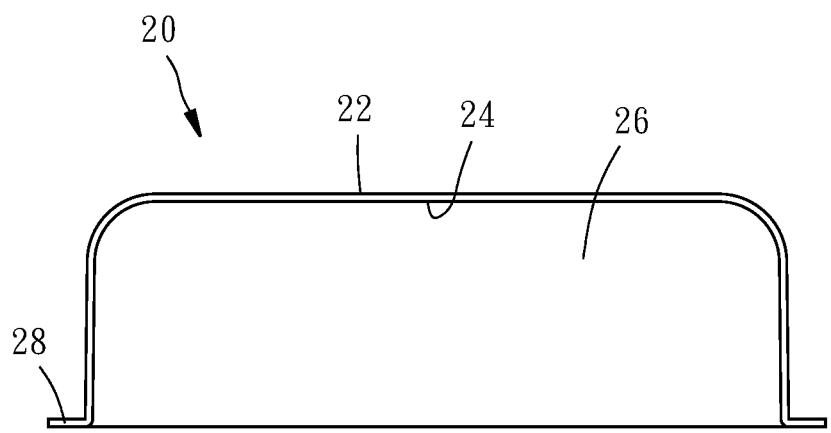
FIG. 2 is a schematic drawing illustrating a thermoplastic shell made into a shell by the application of a vacuum molding method (II).
Figure 3:
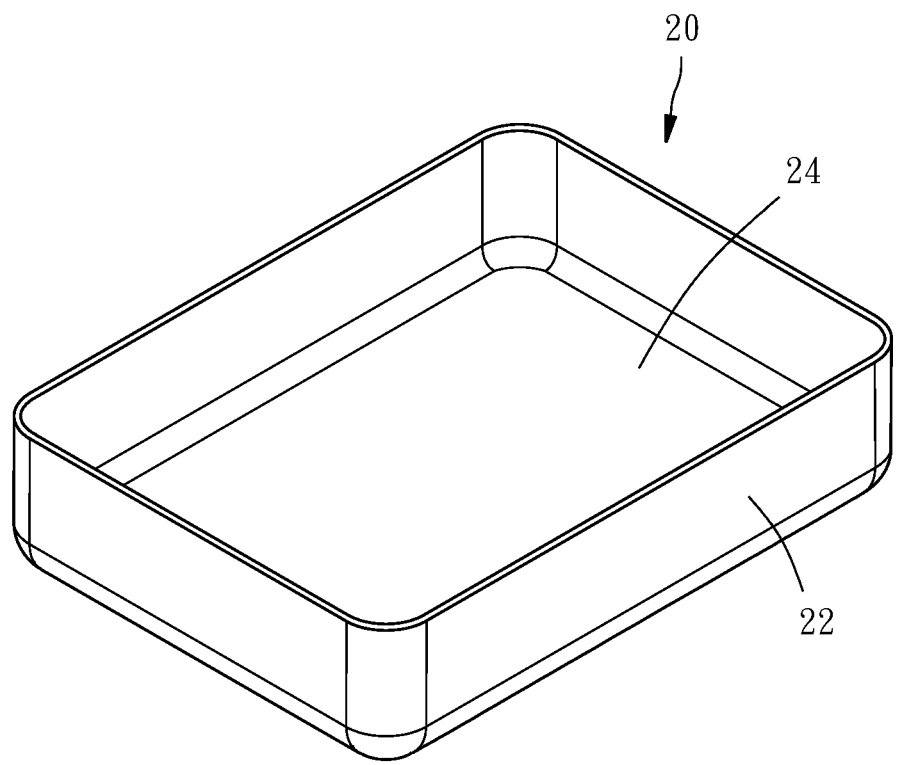
FIG. 3 is a schematic drawing illustrating a thermoplastic shell made into a shell by the application of a vacuum molding method (III).

Referring to FIGS. 1 and 2, first, in Step A, make a thermoplastic sheet 10 into a shell 20 using a vacuum molding method. The shell 20 defines an outer surface 22, an opposing inner surface 24 and an accommodation chamber 26 surrounded by the inner surface 24. The material of the thermoplastic sheet 10 is selected from PP (polypropylene), ABS (Acrylonitrile Butadiene Styrene) resin, PC (polycarbonate), or a combination thereof. Of course, other thermoplastics or combinations of thermoplastics are also covered by the present invention. More specifically, the vacuum molding method (also called blister process) comprises the steps of: providing a vacuum molding device 40 having a mold body 42 that is a male mold having other auxiliary components (such as ribs) therein for making a different design of shell 20, placing the thermoplastic sheet 10 in the vacuum molding device 40 and then heating the vacuum molding device 40 to create a negative pressure so that the thermoplastic sheet 10 is attached to the surface of the mold body 42 and formed into a shell 20. The procedure of heating the vacuum molding device 40 to soften the thermoplastic sheet 10 for causing generation of a negative pressure and molding the thermoplastic sheet 10 into a shell 20 is of the known art, thus, we do not repeat it here. It is to be noted that when the vacuum molding device 40 is used to make the shell 20, the shell 20 will leave a material edge 28 around, as illustrated in FIG. 2. A secondary machining is usually performed to remove the material edge 28, thereby forming the shell 20 shown in FIG. 3.

Figure 4:
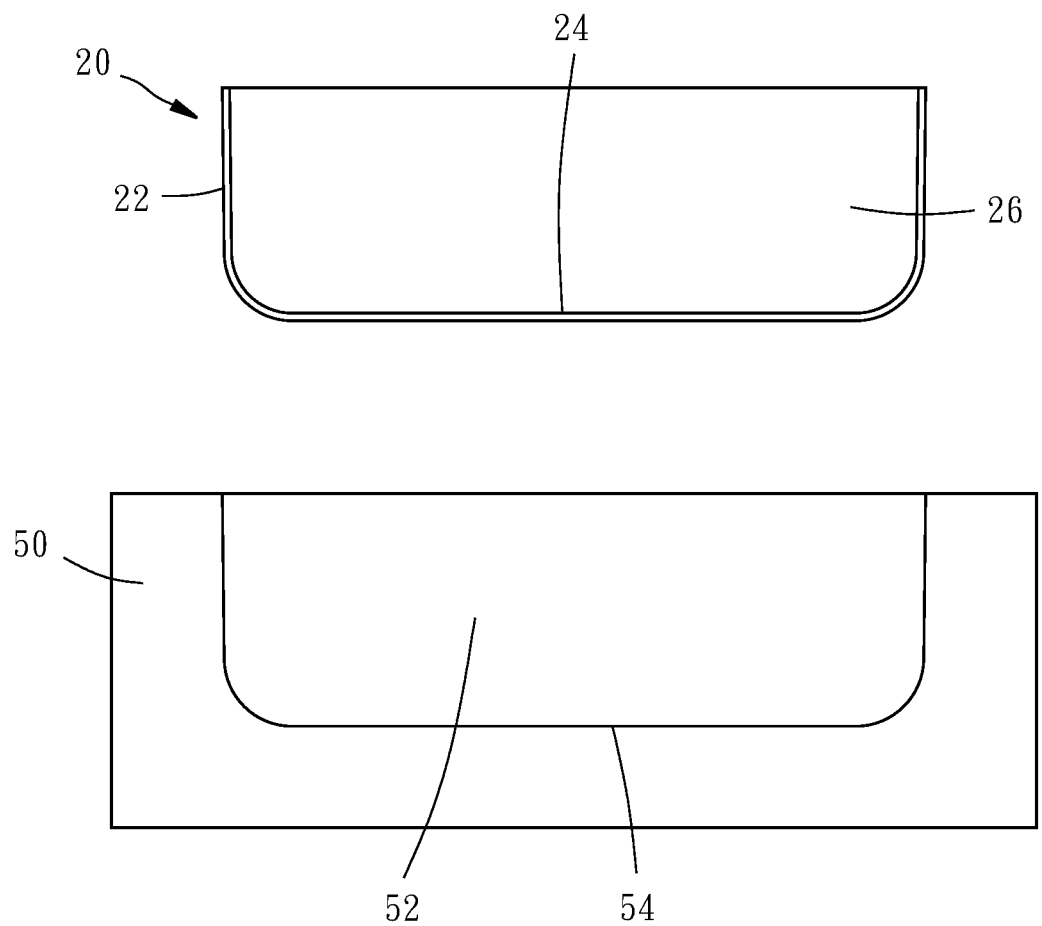
FIG. 4 is a schematic drawing illustrating the placement of the shell in the heating mold (I).
Figure 5:
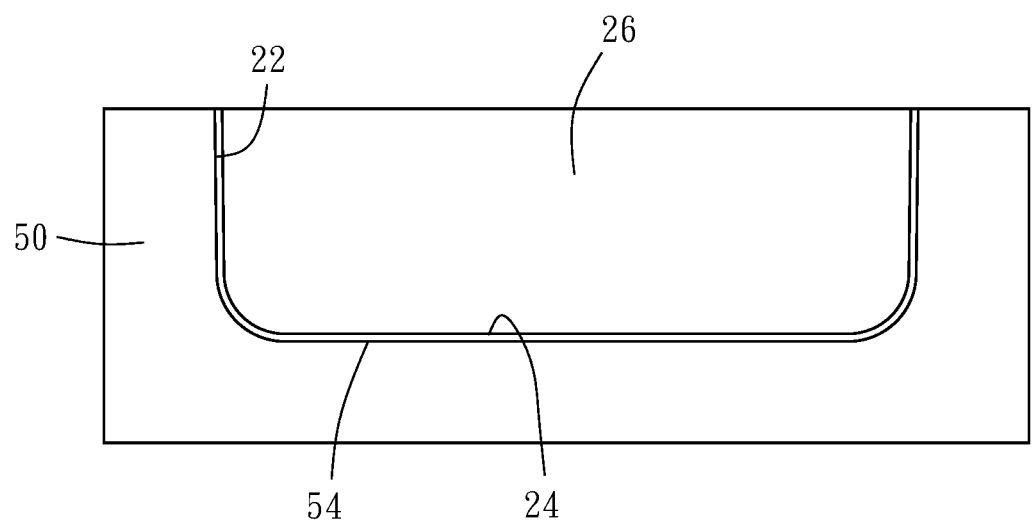
FIG. 5 is a schematic drawing illustrating the placement of the shell in the heating mold (II).

Thereafter, proceed to Step B. As illustrated in FIGS. 4 and 5, provide a heating mold 50 that comprises a female mold area 52 and an inner wall surface 54 defined in the female mold area 52 corresponding to the outer surface 22 of the shell 20, and then place the shell 20 in the female mold area 52 to attach the outer surface 22 of the shell 20 to the inner wall surface 54 of the female mold area 52.

In another embodiment, a design (trademark or pattern) is made on the shell 20. In this embodiment, in Step A, a transparent thermoplastic sheet 10 is selected and formed into a shell 20, and then in Step A or B, a pattern is formed on the inner surface 24 of the shell 20 by paint-spraying, printing or label-adhering.

Figure 6:
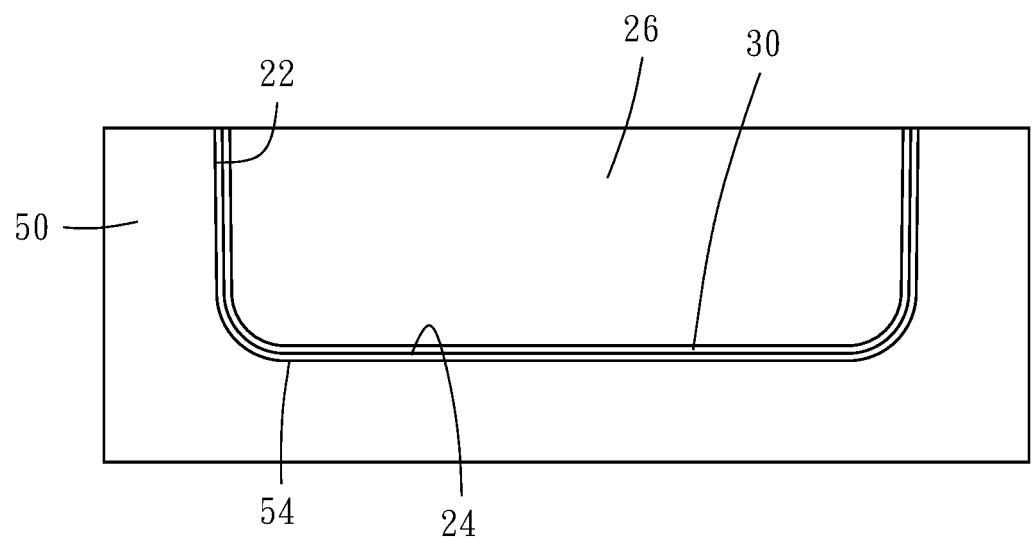
FIG. 6 is a schematic drawing illustrating the thermosetting plastic layer applied to the inner surface of the shell.

Thereafter, proceed to Step C. As illustrated in FIG. 6, apply a molten thermosetting plastic layer 30 to the inner surface 24 of the shell 20. The material of the molten thermosetting plastic layer 30 is selected from epoxy resin or polyester. Other thermosetting materials or their combinations can be selected used without departing from the spirit and scope of the present invention. In this embodiment, the molten thermosetting plastic layer 30 covers over the overall inner surface 24 of the shell 20. In another embodiment, the molten thermosetting plastic layer 30 simply covers specific areas of the inner surface 24 of the shell 20, for example, the four corners of the inner surface 24 of the shell 20 to reinforce the weak areas of the shell 20.

Figure 7:
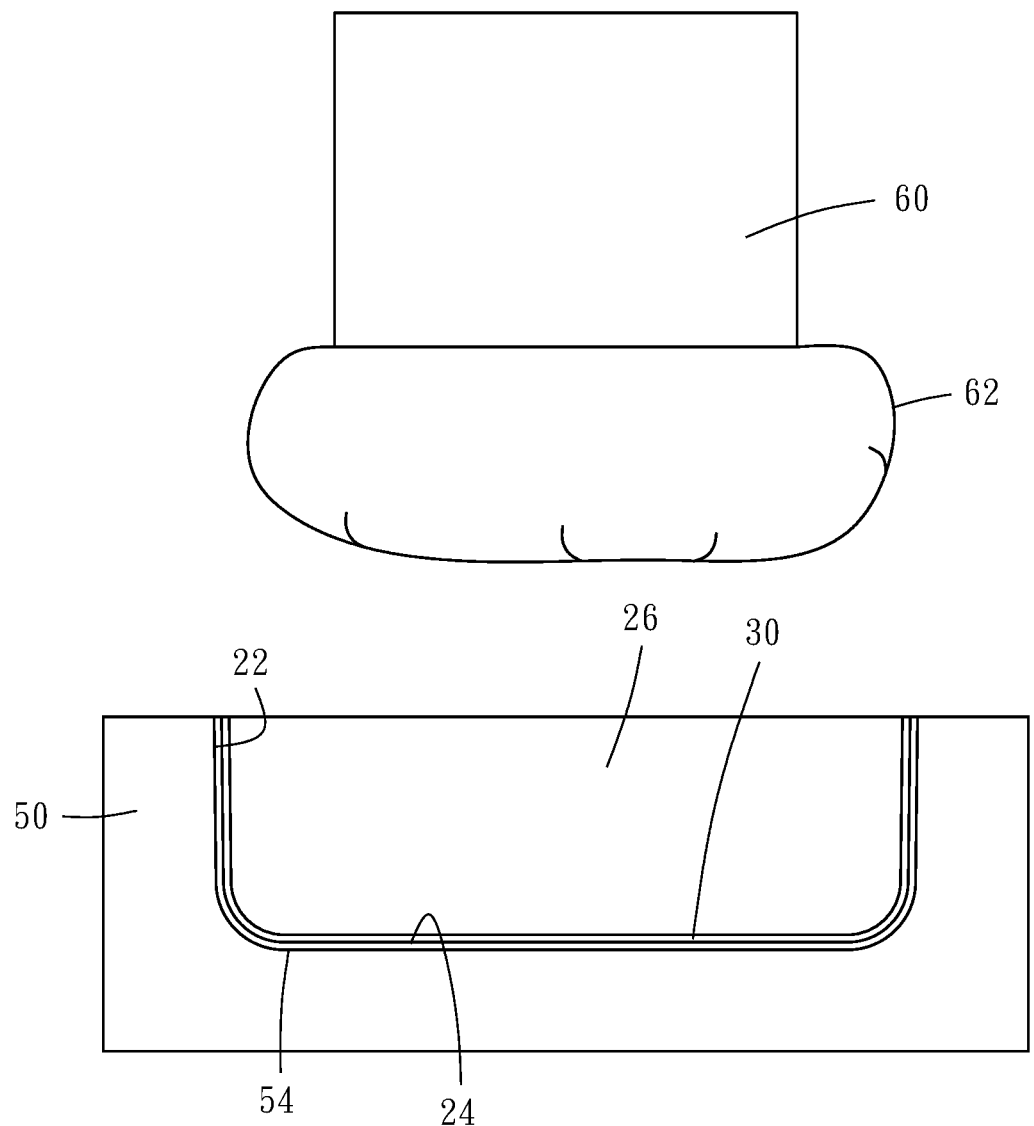
FIG. 7 is a schematic drawing illustrating the application of the inflatable airbag to the molten thermosetting plastic layer (I).
Figure 8:
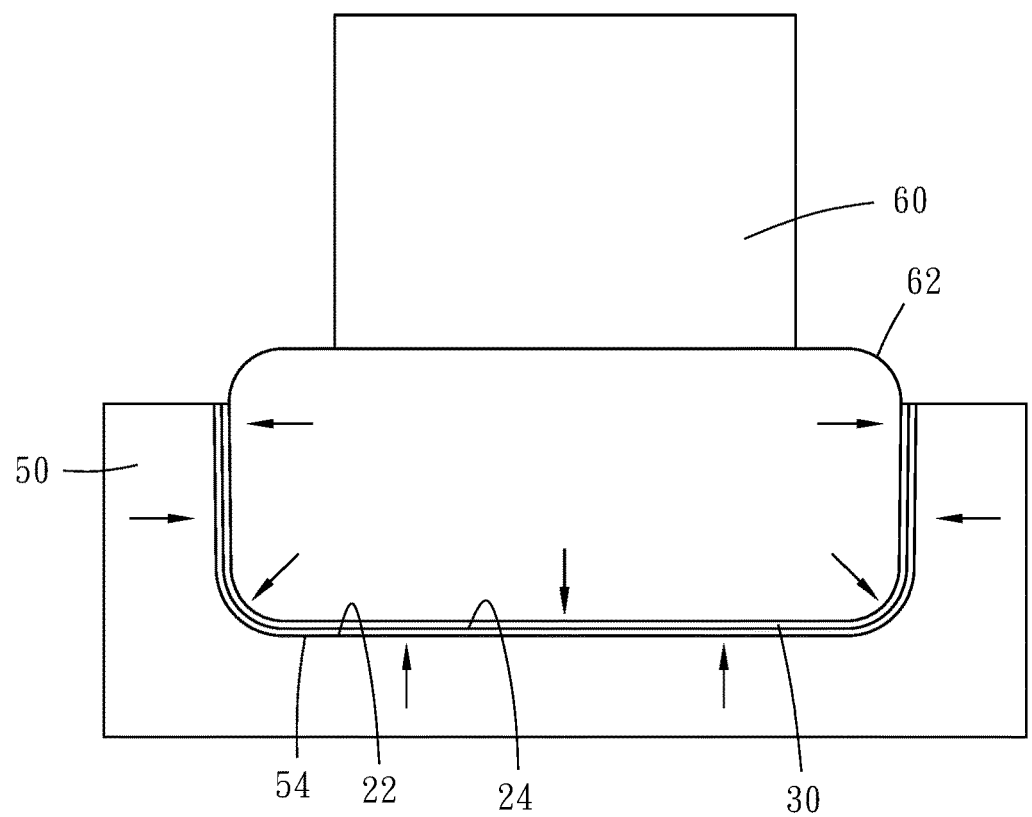
FIG. 8 is a schematic drawing illustrating the application of the inflatable airbag to the molten thermosetting plastic layer (II).

Finally, proceed to Step D. As illustrated in FIGS. 7 and 8, provide an airbag apparatus 60 comprising an inflatable airbag 62, and then put the inflatable airbag 62 of the airbag apparatus 60 in the accommodation chamber 26 of the shell 20, and then inflate the inflatable airbag 62 against the molten thermosetting plastic layer 30 at the inner surface 24 of the shell 20 and simultaneously operate the heating mold 50 to heat the shell 20 and the molten thermosetting plastic layer 30 in the female mold area 52 to about 140° C.~150° C. so that the molten thermosetting plastic layer 30 is cured and bonded to the inner surface 24 of the shell 20, and thus, the shell 20 and the molten thermosetting plastic layer 30 are combined with each other to form a luggage shell 100.

Figure 9:
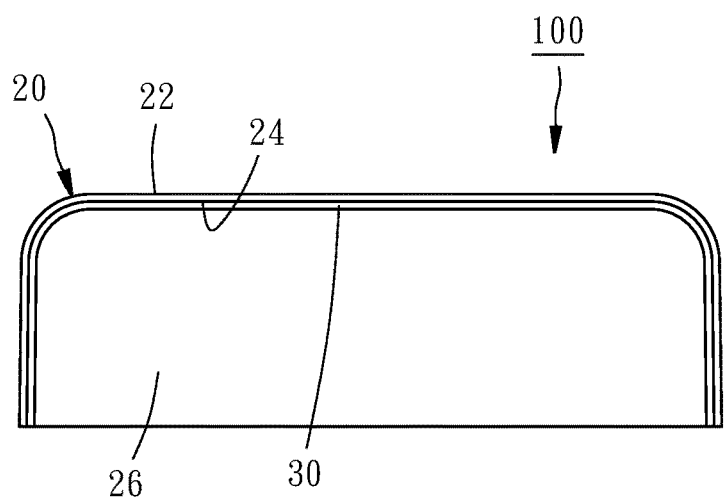
FIG. 9 is a sectional view of a luggage shell made according to the present invention.

Preferably, the luggage shell fabrication method further comprises Step E, as illustrated in FIG. 9, where the inflatable airbag 62 is taken out of the accommodation chamber 26 of the shell 20, and the luggage shell 100 is cooled down. Thus, the fabrication of the luggage shell 100 is done.

Taking the above description into account, the luggage shell fabrication method is achieved by combining the molten thermosetting plastic layer 30 with the inner surface 24 of the shell 20; the structural strength of the shell 20 can be reinforced to avoid damage due to collision or fall. In addition, according to the luggage shell fabrication method provided by the present invention, the molten thermosetting plastic layer can be applied to specific areas (for example, four corners) of the inner surface 24 of the shell 20 according to different needs for specific area reinforcement instead of covering the overall surface area of the inner surface 24 of the shell 20. This not only achieves the function of reinforcing the structural strength, but also reduces the overall weight of the luggage shell 100.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A luggage shell fabrication method, comprising the steps of:
    A) making a thermoplastic sheet into a shell using a vacuum molding method, said shell comprising an outer surface, an opposing inner surface and an accommodation chamber surrounded by said inner surface;
    B) providing a heating mold that defines a female mold area and an inner wall surface in said female mold area, and then placing said shell in said female mold area in a way that said outer surface of said shell faces said inner wall surface of said heating mold;
    C) applying a thermosetting plastic layer to said inner surface of said shell; and
    D) placing an inflatable airbag in said accommodation chamber of said shell and then inflating said inflatable airbag against said thermosetting plastic layer and simultaneously operating said heating mold to heat said shell and said thermosetting plastic layer in said female mold area for causing said shell and said thermosetting plastic layer to be combined with each other to form a luggage shell.

2. The luggage shell fabrication method as claimed in claim 1, wherein in step D, said female mold area is heated to about 140° C.~150° C.

3. The luggage shell fabrication method as claimed in claim 1, wherein in step A, said thermoplastic sheet is transparent.

4. The luggage shell fabrication method as claimed in claim 3, further comprising a sub-step in one of step A and step B to form a pattern on said inner surface of said shell by one of pain-spraying, printing and label-adhering techniques.

5. The luggage shell fabrication method as claimed in claim 1, wherein in step A, said vacuum molding method is performed by: providing a vacuum molding device comprising a mold body, and then placing said thermoplastic sheet in said vacuum molding device and then heating said vacuum molding device to create a negative pressure so that said thermoplastic sheet is attached to a surface of said mold body and formed into said shell.

6. The luggage shell fabrication method as claimed in claim 1, wherein in step C, said thermosetting plastic layer is in a molten status.

7. The luggage shell fabrication method as claimed in claim 6, wherein in step D, said molten thermosetting plastic layer is heated by said heating mold and cured and bonded to said inner surface of said shell.

8. The luggage shell fabrication method as claimed in claim 1, further comprising step E after step D to remove said inflatable airbag from said accommodation chamber of said shell and then to cool down said luggage shell.

\* \* \* \* \*